UNITED STATES PATENT OFFICE.

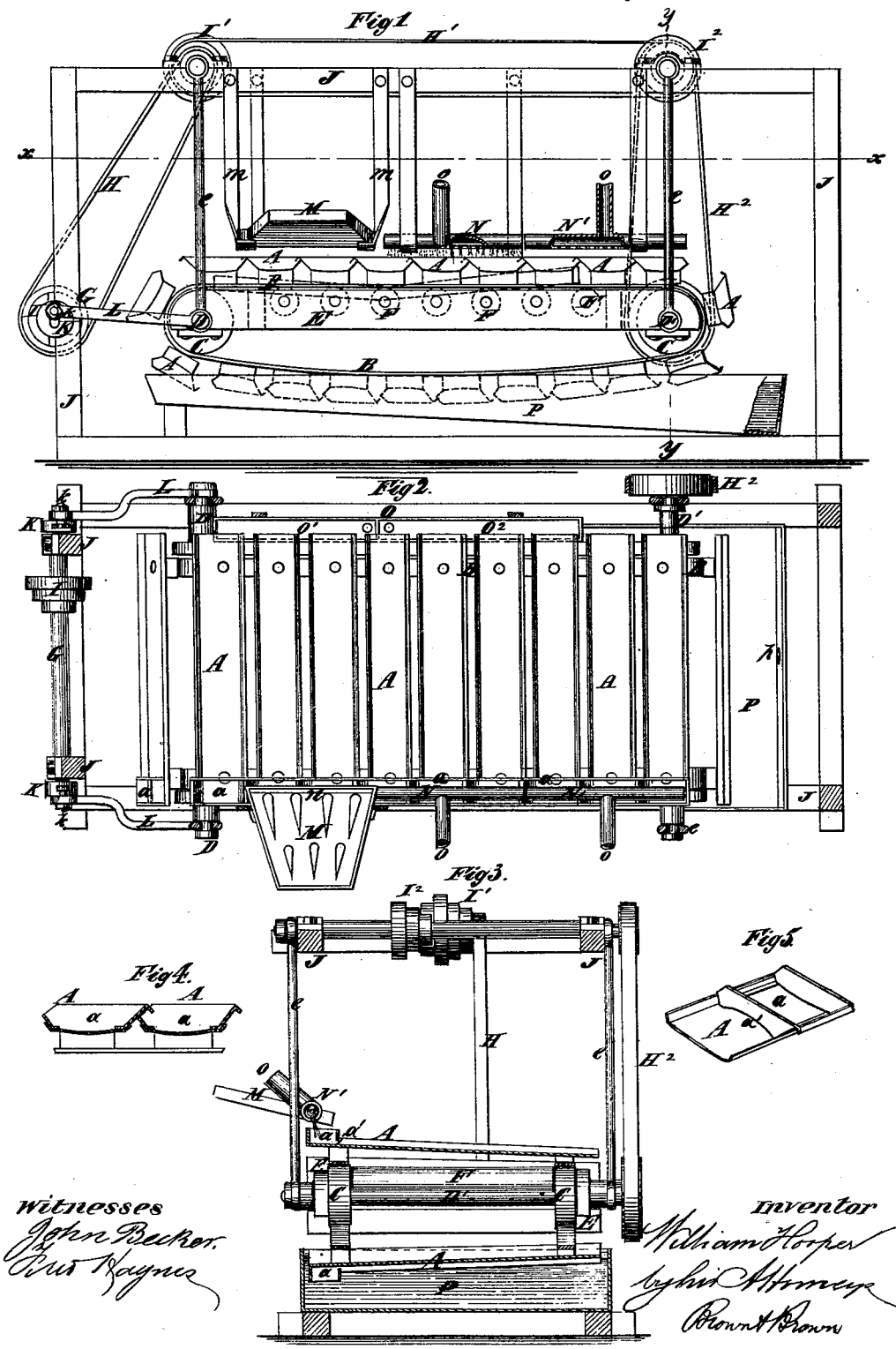

WILLIAM HOOPER, OF TICONDEROGA, NEW YORK.

IMPROVEMENT IN MACHINES FOR WASHING ORES.

Specification forming part of Letters Patent No. 214,140, dated April 8, 1879; application filed November 20, 1878.

*To all whom it may concern:*

Be it known that I, WILLIAM HOOPER, of Ticonderoga, in the county of Essex and State of New York, have invented certain new and useful Improvements in Machines for Washing Ores, of which the following is a description.

One of my improvements consists in a machine for washing ore, comprising the combination of a series of sluices open at one end and arranged transversely on one or more endless bands adapted for a progressive motion, a spout for feeding ore and water to said sluices, and means for subsequently feeding water alone to said sluices upon the arrival of the latter in a suitable position.

Another of my improvements consists in a machine for washing ore, comprising the combination of a series of sluices open at one end and arranged transversely on one or more endless bands adapted for a progressive motion, a spout for feeding ore and water to said sluices, means for subsequently feeding water alone to said sluices upon their arrival in a suitable position, and a trough or collector divided by partitions, into which the ore is discharged from the sluices.

Another of my improvements consists in a machine for washing ore, comprising the combination of a series of sluices open at one end and arranged transversely on one or more endless bands adapted for a progressive motion, and means for imparting a reciprocating motion to said sluices.

Another of my improvements consists in a series of sluices open at one end and arranged transversely on one or more endless bands adapted for a progressive motion, each of said sluices being so formed for a portion of its length as to overlap the adjoining sluice, and divided transversely by a partition reaching nearly to the bottom thereof, whereby box-like receptacles are formed for the reception of the ore.

Another of my improvements consists in a machine for washing ore, comprising the combination of a series of sluices open at one end and arranged transversely on one or more endless bands adapted for a progressive motion, each of said sluices being divided transversely near its closed end by a partition reaching nearly to the bottom thereof, and forming a box-like receptacle, means for feeding ore and water to said receptacles, and means for subsequently feeding water alone to said receptacles upon their arrival at the proper place.

Other improvements consist in details of construction, to be hereinafter described.

In the accompanying drawings, Figure 1 represents a side elevation of a machine embodying my improvements; Fig. 2, a horizontal section thereof on the line $x\ x$, Fig. 1; Fig. 3, a transverse section thereof on the dotted line $y\ y$, Fig. 1; and Figs. 4 and 5 are, respectively, a cross-section and perspective view of the sluices, showing their overlapping portions.

Similar letters of reference designate corresponding parts in all the figures.

A designates the sluices, upon which the ore is washed. They are represented as formed of sheet metal, having upturned edges, and as open at one end. Any number of them may be arranged on endless bands B, and they are preferably so fastened to the said bands that they incline toward their open ends sufficiently to allow water to run freely along them.

A progressive motion is imparted to the endless bands or carriers B by means of pulleys or drums C, mounted on shafts D D', which are carried by a frame-work, E. To support the bands B, and prevent them from sagging through the weight of ore in the sluices, I preferably employ a series of rollers, F, arranged transversely across the frame-work E, and upon which the bands or carriers B rest.

Motion is imparted to the bands or carriers B from the main driving-shaft G of the machine by means of belts H H¹ H², which preferably pass over cone-pulleys I I¹ I², whereby the speed of the bands or carriers B may be varied to suit the grade of ore to be washed.

For the purpose of agitating the ore while upon the sluices, I preferably impart to the frame E a reciprocatory or vibratory motion in the direction of the length of the chain. To admit of this the said frame E is shown as suspended by means of rods $e$ from the main frame-work J of the machine.

K represents cranks, which are mounted upon the driving shaft G, and which are provided with crank-pins k.

L designates connecting-rods for imparting the motion from the cranks to the frame E. The crank-pins k are preferably adjustable in said cranks, so that their throw may be varied at pleasure and a greater or less movement be given to the frame E at each revolution of the cranks.

M designates a spout, through which the ore and water are fed to the sluices A. It is shown as suspended by bars m from the main frame J of the machine, and at its lower edge is provided with a slot, n, through which the ore and water are fed onto the sluices. N designates a perforated pipe extending transversely across the sluices at the side of the spout M, and N' designates a similarly-perforated pipe extending transversely across the sluices at the end of the pipe N. These perforated pipes are shown as provided with inlets o, through which they are supplied with water. Each of said sluices A is preferably provided, near its closed end, with a transverse partition reaching nearly to the bottom thereof, (see Fig. 5,) and forming a box-like receptacle, a, into which the ore is fed, and from which it passes out through the openings a'. The water which is fed into the receptacles a with the ore, and that which is subsequently fed into said receptacles by the pipes N and N' upon the arrival of the sluices opposite said pipes, gradually washes the ore out through the narrow openings between the transverse partitions and the bottom of the sluices and along the said sluices until it reaches their lower ends, where it is delivered into a trough or collector, O, extending along the side of the machine. This trough or collector is preferably divided by partitions into two or more portions, each of which is provided with a delivery-outlet for the washed ore. Thus the ore which is washed out by the water that is fed into the sluices with the ore falls into the section $O^1$ of the trough or collector. The ore which is washed out by the water that enters through the pipe N falls into the section $O^2$ of the trough or collector; and a third section of trough might be provided for receiving the ore washed out by the water fed in through the pipe N'. Hence it will be seen that the different grades of ore may be readily separated or divided into headings, middlings, and tailings with very little loss.

To prevent the ore and water from falling between the sluices as they are fed thereto, the portion of each sluice which forms the side of the receptacle a is extended sufficiently to overlap the sluice next adjoining, (see Figs. 4 and 5,) thus forming a continuous trough across the sluices.

P designates a pan or trough, to which water may be supplied, and which is furnished with an outlet, p. The ore, after passing over the machine, is deposited in this pan, from which it may be taken to be rewashed. The sluices in returning to the feeder come in contact with the water in the pan P, and are thereby kept clean.

The above description of the use of the pan P applies only to washing such ores as are heavier than the gangue.

In washing graphite ore, in which the gangue is heavier than the ore, the gangue would be carried over into the pan P, and the ore washed out through the open ends of the sluices into the trough or collector O.

What I claim as my invention, and desire to secure by Letters Patent, is—

1. In a machine for washing ore, the combination of a series of sluices open at one end and arranged transversely on one or more endless bands adapted for a progressive motion, a spout for feeding ore and water to said sluices, and means for subsequently feeding water alone to said sluices after the latter have been carried a certain distance by the motion of the bands, substantially as specified.

2. In a machine for washing ore, the combination of a series of sluices open at one end and arranged transversely on one or more endless bands adapted for a progressive motion, a spout for feeding ore and water to said sluices, means for subsequently feeding water alone to said sluices at a certain stage of their motion with the endless bands, and a trough divided by partitions, into which the ore is discharged from the sluices, substantially as and for the purpose specified.

3. In a machine for washing ore, the combination of a series of sluices open at one end and arranged transversely on one or more endless bands adapted for progressive motion, and means for imparting a reciprocating motion to said sluices, substantially as specified.

4. In a machine for washing ore, a series of sluices open at one end, arranged transversely on one or more endless bands adapted for a progressive motion, each of said sluices overlapping its successor for a portion of its length, and being divided transversely by a partition reaching nearly to the bottom thereof, whereby box-like receptacles are formed for the reception of the ore, substantially as herein described.

5. In a machine for washing ore, the combination of a series of sluices open at one end and arranged transversely on one or more endless bands adapted for a progressive motion, each of said sluices being divided transversely near its closed end by a partition reaching nearly to the bottom thereof, and forming a box-like receptacle, of means for feeding ore and water to said receptacles, and means for subsequently feeding water alone to said receptacles upon their arrival at the proper place, substantially as and for the purpose specified.

6. In a machine for washing ore, the combination of an endless chain of sluices carried by a suspended frame, capable of a reciprocating motion in the direction of the length of the chain, and means whereby such reciprocating motion may be imparted to said frame, substantially as specified.

7. In a machine for washing ore, the combination of the sluices A, arranged on endless bands B, carried by the suspended frame E, the rollers F, belts H H¹ H², pulleys I I¹ I², driving-shaft G, connecting-rods L, spout M, pipes N N', trough or collector O, and pan P, substantially as specified.

WILLIAM HOOPER.

Witnesses:
J. L. WHEELER,
JOHN C. HOLLEMBACK.